US 8,595,487 B2

(12) United States Patent
Govil et al.

(10) Patent No.: US 8,595,487 B2
(45) Date of Patent: Nov. 26, 2013

(54) VIRTUALIZATION HARDWARE FOR DEVICE DRIVER ISOLATION

(75) Inventors: Kinshuk Govil, Los Altos, CA (US); Keith Adams, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1452 days.

(21) Appl. No.: 11/555,679

(22) Filed: Nov. 1, 2006

(65) Prior Publication Data

US 2008/0148048 A1 Jun. 19, 2008

(51) Int. Cl.
*H04L 29/06* (2006.01)
*G06F 9/46* (2006.01)

(52) U.S. Cl.
USPC ........... 713/164; 713/165; 713/166; 713/167; 718/104; 718/106

(58) Field of Classification Search
USPC ........... 713/164–167; 718/104, 106; 719/321, 719/324
See application file for complete search history.

(56) References Cited

U.S. PATENT DOCUMENTS

| 6,880,022 B1 | 4/2005 | Waldspurger et al. |
| 2005/0223221 A1* | 10/2005 | Proudler et al. ............... 713/164 |
| 2005/0246718 A1* | 11/2005 | Erlingsson et al. ........... 719/317 |
| 2008/0141266 A1* | 6/2008 | Hunt et al. .................... 718/106 |

OTHER PUBLICATIONS

Xen and the Art of Virtualization; Barham et al; SOSP'03, Oct. 19-22, 2003, Bolton Landing, New York, USA Copright 2003.*
sHype: Secure Hypervisor Approach to Trusted Virtualized Systems; RC23511 (W0502-006) Feb. 2, 2005, IBM Research Report.*
*System Architecture Group*, [online], [Retrieved on Feb. 13, 2008, Copyright 2000-2008], Retrieved from URL: http://14ka.org/projects/virtualization/drivers.php.
*The Xen™ virtual machine monitor*, [online], [Retrieved on Feb. 13, 2008, last updated May 8, 2007], Retrieved from URL: http://www.cl.cam.ac.uk/research/srg/netos/xen/.
Fernando Terroso-Sáenz, Ricardo Fernández-Pascual and José M. García, "Virtualization technologies: An Overview", XIX Jornadas de Paralelismo, Castellón (Spain), Sep. 2008.

* cited by examiner

*Primary Examiner* — Taghi Arani
*Assistant Examiner* — Jahangir Kabir

(57) ABSTRACT

Hardware virtualization support is used to isolate kernel extensions. A kernel and various kernel extensions are executed in a plurality of hardware protection domains. Each hardware protection domain defines computer resource privileges allowed to code executing in that hardware protection domain. Kernel extensions execute with appropriate computer resource privileges to complete tasks without comprising the stability of the computer system.

52 Claims, 10 Drawing Sheets

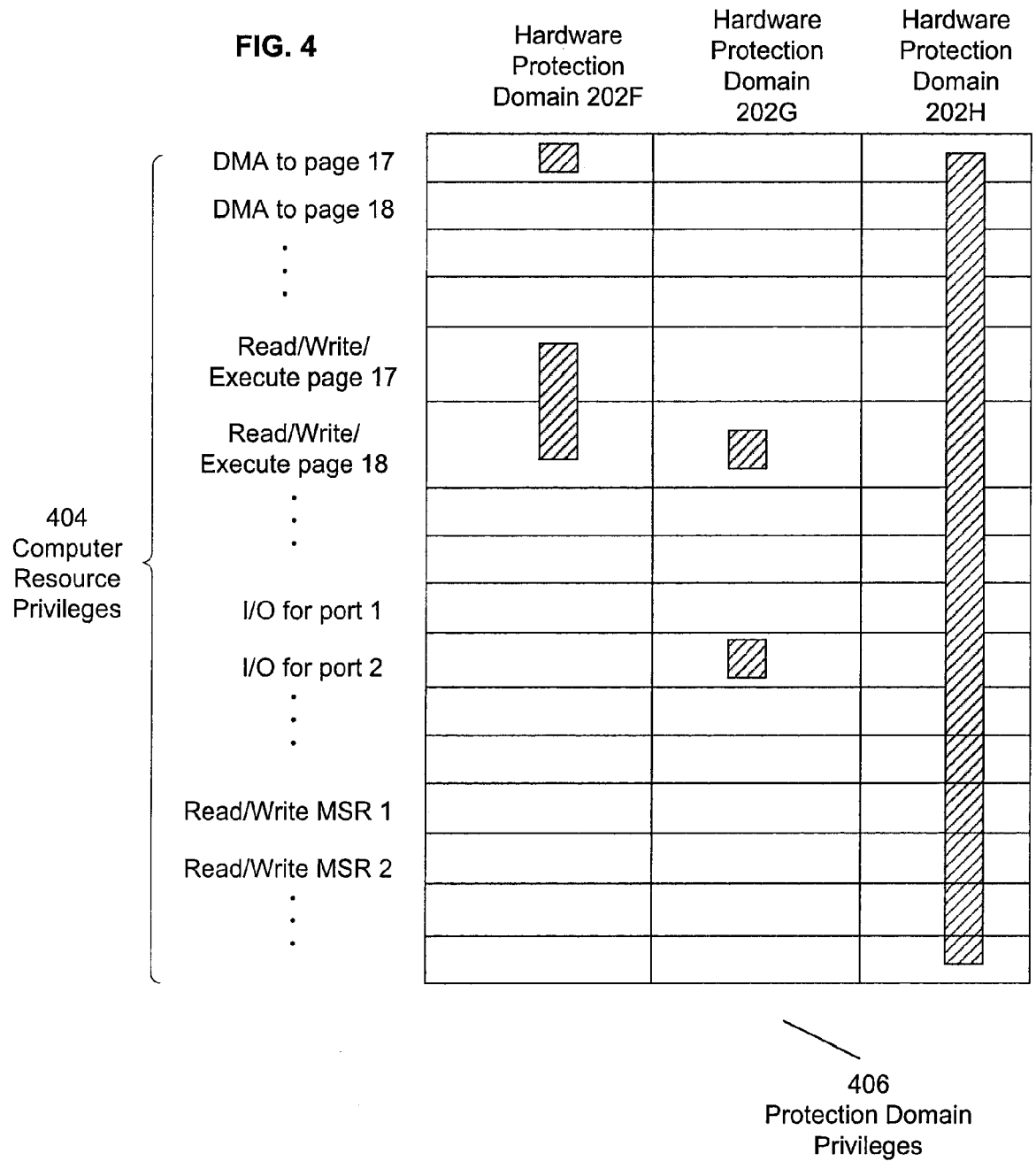

VIRTUALIZATION HARDWARE FOR DEVICE DRIVER ISOLATION

BACKGROUND OF THE INVENTION

1. Field of the Invention

The invention relates generally to operating system stability and security, and specifically to the isolation of device drivers within a computer system.

2. Description of Background Art

It is recognized in the field of computer science that device drivers are a weak link in the systems and methods designed to ensure computer system stability and security. Because device drivers frequently interact with hardware, they are typically designed to execute with special execution privilege levels not normally afforded to applications. In fact, in many operating systems, device drivers execute on the same execution privilege level as the operating system kernel itself. Executing a device driver with a special execution privilege level introduces the possibility that the device driver may not be subject to the security policies and fault protections that ordinarily protect the computer system. Device drivers, either through error or malicious intent on the part of their designer, can seriously compromise the trustworthiness of the computer system on which they are executed. Furthermore, because different device drivers are typically designed for various kinds of hardware, a large number of device drivers are available. The sheer volume of device drivers makes consistent quality control a challenge, and yet in many operating systems a single device driver can undermine the rigorous quality control invested in the operating systems.

One possible approach to the device driver stability problem is to redesign device drivers to execute without special execution privilege levels. Device drivers would execute with the same (or similar) execution privilege level as user applications, and therefore would be subject to the operating system precautions normally taken for user applications. However, the tradition of privileged device driver execution is well-established in device driver design, and the canon of legacy device drivers that would need to be rewritten is enormous. Therefore, even if all device drivers could be successfully rewritten as unprivileged applications, this approach would be extremely costly and largely impractical.

Another possible approach is to execute each device driver in a separate virtual memory address space, providing the ability to limit the memory addresses to which a device driver is capable of writing. However, the driver nonetheless has the ability to execute instructions with a special execution privilege level, set special registers, and access input/output devices. Therefore, a maliciously or improperly designed device driver can cause harm to the computer system despite the separate virtual address space. Thus executing a device driver in a separate virtual memory address space is, by itself, an insufficient solution.

Some have suggested isolating device drivers in distinct, software-implemented "virtual machines" (see below). In this approach, a full computer system is software-virtualized to execute the device driver, an operating system and guest applications.

Executing a device driver in a separate virtual machine can provide some protection against malignant actions by the device driver, but this protection comes with considerable cost in terms of processing and storage overheads. A virtual machine must be scheduled and serviced for each isolated device driver. The virtual machine abstraction reduces the performance of the guest applications and the device driver. As the number of isolated drivers increases, the performance loss increases.

Therefore, what is needed is a technique for efficiently isolating device drivers without the need to rewrite existing device driver code.

SUMMARY OF THE INVENTION

The invention isolates kernel extensions (such as device drivers) using hardware virtualization support. An operating system kernel is protected from a kernel extension by executing the kernel and the kernel extension in separate hardware protection domains. A hardware protection domain defines computer resource privileges which code running in that domain can access. Hardware virtualization support is used to grant kernel extensions access to the computer resource privileges appropriate for the kernel extension to function properly, while limiting access to computer resource privileges that could potentially harm the computer system. The computer resource privileges available to a kernel extension can be modified as the computer resource privileges appropriate to the tasks of a given kernel extension change in the course of execution.

According to one embodiment of the present invention, the kernel extension has access to sufficient computer resource privileges for the kernel extension to execute certain instructions with a special execution privilege level. The protections of the hardware protection domain are transparent to the kernel extension, and a kernel extension designed to execute with a special execution privilege level can execute successfully without the need to rewrite or modify the kernel extension.

BRIEF DESCRIPTION OF THE DRAWINGS

FIG. 4 illustrates several examples of hardware protection domains associated with different computer resource privileges.

DETAILED DESCRIPTION

A preferred embodiment of the present invention is now described with reference to the figures where like reference numbers indicate identical or functionally similar elements.

Figure 1:
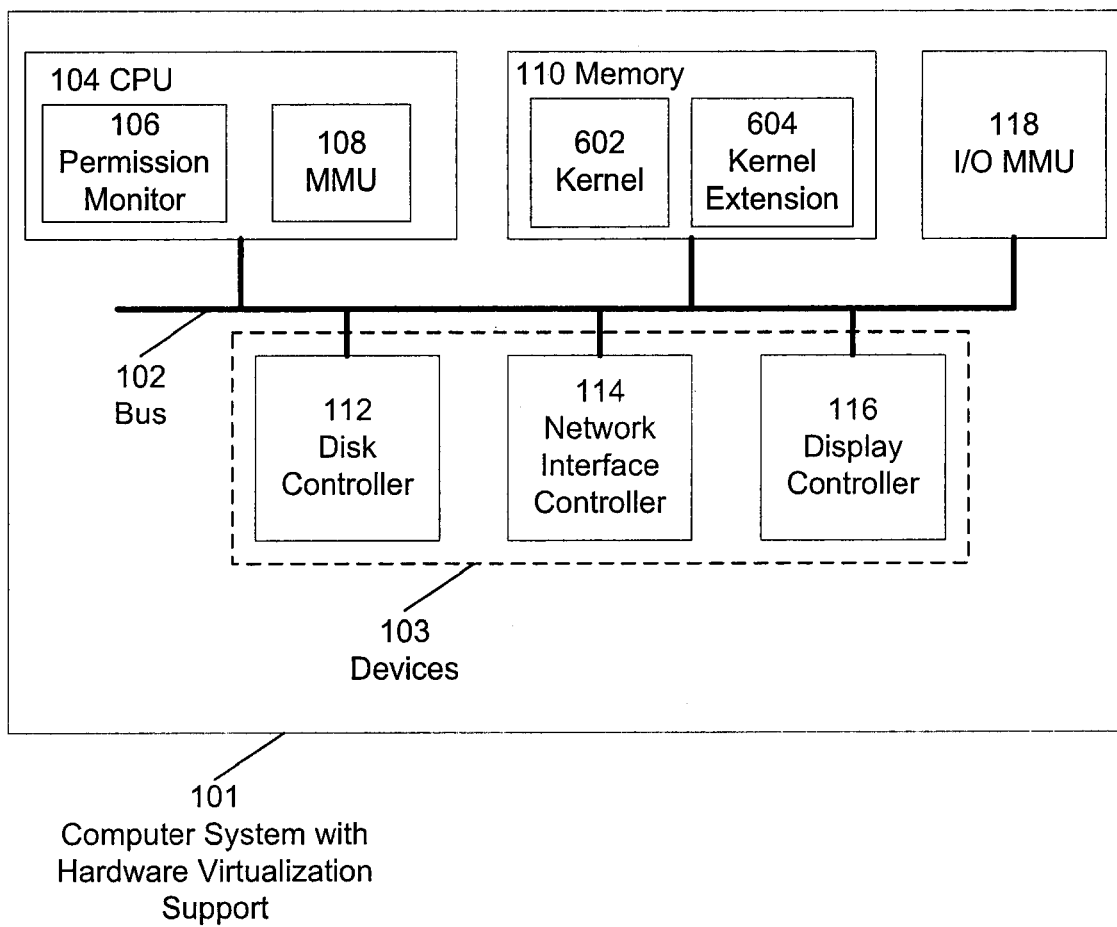
FIG. 1 illustrates a computer system with hardware virtualization support.

FIG. 1 illustrates a computer system with hardware virtualization support 101. Computer systems with hardware virtualization support have been publicly proposed and are now commercially available. One example of computer systems with hardware virtualization support are computer systems designed with the Intel™ Virtualization Technology of Intel Corporation of Santa Clara, Calif. Another example of computer systems with hardware virtualization support are computer systems designed with AMD™ Secure Virtual Machine technology of AMD Corporation of Sunnyvale, Calif. The examples of hardware virtualization support technologies described herein are given for the purposes of illustration and are not limiting. The invention can be used with various implementations of hardware virtualization support, and is not specific to the design or configuration of any particular manufacturer or hardware virtualization technology. The language used herein has been selected to generically describe the components that are commonly available in virtualization hardware. The terminology used to describe hardware components and capabilities may vary from manufacturer to manufacturer. Furthermore, in various embodiments, elements of the hardware may be configured in a variety of manners that differ from those shown in the figures and/or described herein. It will be apparent to one of skill in the art that such descriptions are not limiting, and that device driver isolation may be implemented in hardware with various capabilities and configurations without departing from the scope of the present invention.

The computer system with hardware virtualization support 101 can be used to separate the virtual machines into distinct hardware protection domains. The computer system with hardware virtualization support 101 includes one or more central processing units (CPUs) 104, a bus 102, a memory 110 and an I/O MMU 118 and devices 103. The bus 102 allows bidirectional communication among the devices 103, the CPU 104, the memory 110, and the I/O MMU 118. While a single CPU 104 is shown in the figure and described herein, the computer system with hardware virtualization support 101 can also include more than one CPU 104 without departing from the scope of the present invention.

The CPU 104 is capable of executing computer instructions and provides hardware virtualization support. One example of a CPU suitable for the invention is one of the Xeon™ family of processors made by Intel Corporation of Santa Clara, Calif., but other CPUs may be used without departing from the scope of the present invention. The CPU 104 includes a permission monitor 106. The permission monitor 106 ensures that only instructions allowed in the current hardware protection domain are allowed to execute. An example of a policy that might be used by the permission monitor 106 is described herein with reference to FIG. 8.

The CPU 104 also includes a memory management unit (MMU) 108. The MMU 108 stores a hardware page table for managing the storage of data in the memory 110. The MMU 108 controls access to the memory 110 by the CPU 104. A method used by the MMU 108 is described herein with reference to FIG. 6.

The input/output memory management unit (I/O MMU) 118 stores an input/output page table for managing the storage of data in the memory 110. The I/O MMU 118 controls access to the memory 110 by the devices 103. A method used by the I/O MMU 118 is described herein with reference to FIG. 7. According to one embodiment of the present invention, the I/O MMU 118 is included in the bus 102.

The memory 110 includes a kernel 600 and at least one kernel extension 604. The kernel 600 is a set of computer instructions (also referred to as "kernel code") comprising the core of an operating system. The kernel 600 may include, for example, computer instructions for managing applications, allocating computer resources, and prioritizing the requirements of the devices 103. The computer instructions of the kernel 600 execute with a special execution privilege level on the CPU 104.

The memory 110 also includes at least one kernel extension 604. The kernel extension 604 is a set of computer instructions (also referred to as "kernel extension code") providing some functionality to the operating system. For example, the kernel extension 604 can be a device driver, a file system, a storage management module, a stream module, a network protocol module, a CPU scheduler, a memory scheduler, an input/output scheduler, a statistics monitoring module, or any module that exports functions for use by the kernel 600. The kernel 600 calls a kernel extension 604 function to perform some operation, and at the completion of that operation, the kernel extension 604 returns to the kernel 600. The kernel 600 cooperates with the kernel extension 604 to perform certain functions. For example, the kernel 600 can use the kernel extension 604 as an interface for communicating with the devices 103. Several examples of cooperation between the kernel 600 and the kernel extension 604 are described herein with reference to FIG. 5.

According to one embodiment of the present invention, the computer instructions of the kernel extension 604 execute on the CPU 104 with special execution privilege levels. An execution privilege level is a runtime mode defining a fixed set of instructions which are allowed to execute on the CPU 104. A special execution privilege level allows the execution of instructions that are not allowed in other execution privilege levels. In the Intel x86 processor architecture, for example, the execution privilege level is referred to as the "current privilege level" (or "CPL"), and CPL 0 is one such special execution privilege level.

In certain architectures, and according to one embodiment of the present invention, the kernel extension 604 executes with the same execution privilege level as the kernel 600. In the Intel x86 processor architecture, for example, both the kernel 600 and the kernel extension 604 can execute at CPL 0.

According to one embodiment of the present invention, the kernel 600 and the kernel extension 604 execute in the same instruction space on the CPU 104. The CPU 104 can directly follow calls from instructions in the kernel 600 to instructions in the kernel extension 604 and can directly follow calls from instructions in the kernel extension 604 to instructions in the kernel 600. For example, the kernel 600 can include a call to a destination instruction in the kernel extension 604, and this call can specify the destination instruction by an address in memory. The ability to directly switch from execution of the kernel 600 to execution of the kernel extension 604 provides for fast switching and efficient isolation of the kernel extension.

In the example illustrated, the devices 103 include a disk controller 112, a network interface controller 114, and a display controller 116. A device 103 may be associated with a particular kernel extension 604, such as a device driver. For example, one of the kernel extensions 604 may be a device driver for the network interface controller 114. When the kernel 600 encounters a procedure calling for the network interface controller 114, the kernel 600 calls to the kernel extension 604 to perform the procedure. The kernel extension 604 interacts with the network interface controller 114 to perform the procedure, and returns to the kernel 600.

The examples of devices 103 illustrated in the figure have been chosen for the purposes of illustration and are not limiting. Other devices 103 can be included in or associated with the computer system with hardware virtualization support 101 without departing from the scope of the present invention. Furthermore, the various hardware components of the computer system with hardware virtualization support 101 have been shown separately for the purposes of illustration, but it will be apparent to one of skill in the art that in many implementations these hardware components will be combined. Other components can be included in the computer system with hardware virtualization support 101 without departing from the scope of the present invention.

Figure 2:
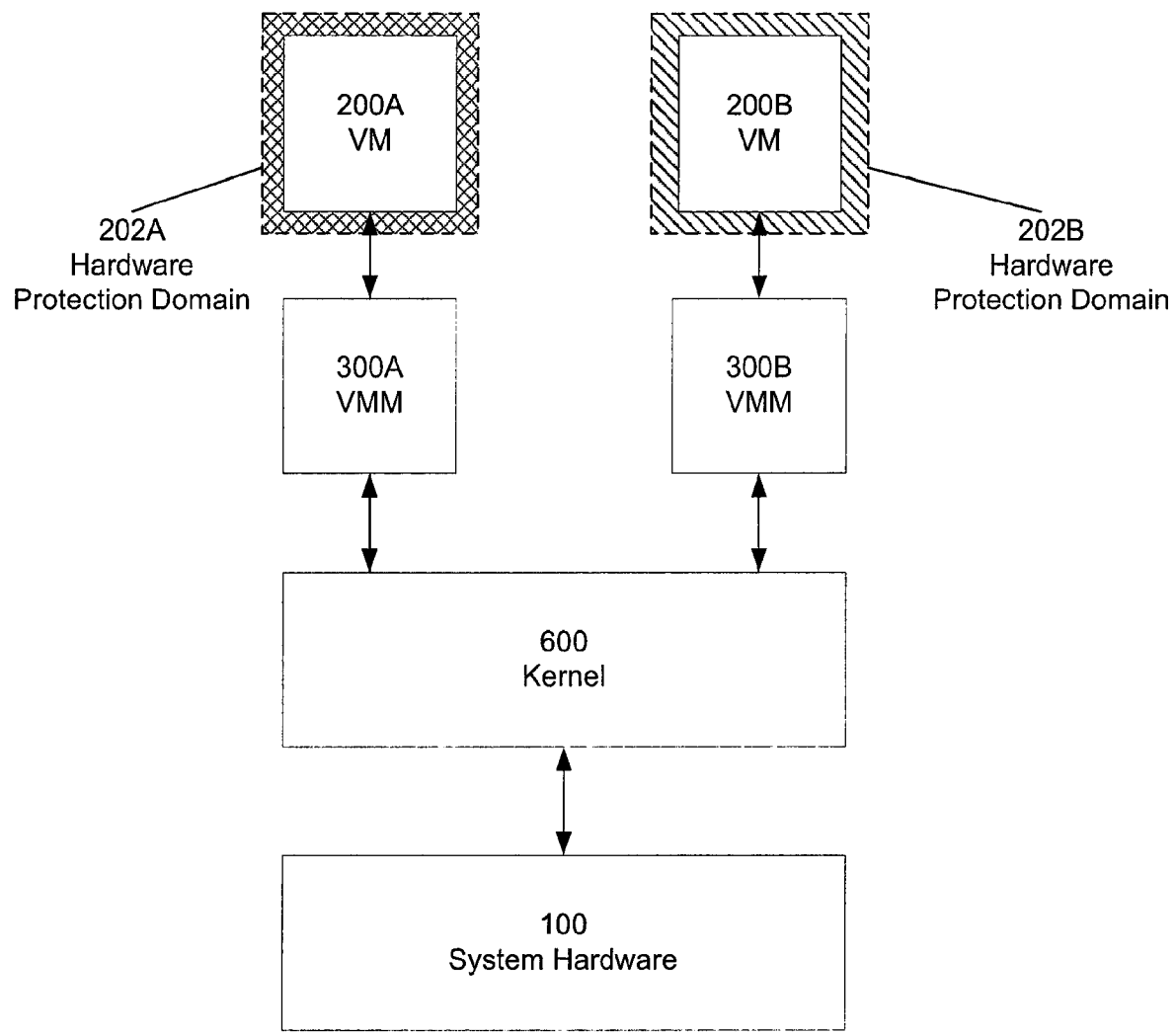
FIG. 2 illustrates using a computer system with hardware virtualization support to assign virtual machines to hardware protection domains.

FIG. 2 illustrates using a computer system with hardware virtualization support to assign virtual machines to hardware protection domains. FIG. 2 illustrates an exemplary configuration of virtual machines for the purposes of discussing the capabilities of the computer system with hardware virtualization support 101.

A virtual machine (VM) is an abstraction—a "virtualization"—of an actual physical computer system. The virtual machines (VMs) or "guests" 200 have both virtual system hardware and guest system software. The virtual system hardware includes a complete computer, typically at least one virtual CPU, virtual memory, at least one virtual disk, and one or more virtual devices. All of the virtual hardware components of the VM may be implemented in software using known techniques to emulate the corresponding physical components. The guest system software includes a guest operating system (guest OS) and drivers as needed for the various virtual devices. If the VM is properly designed, applications running on the VM will function as they would if run on a "real" computer, even though the applications are running at least partially indirectly, that is via the guest OS and virtual processor(s). Executable files will be accessed by the guest OS from the virtual disk or virtual memory, which will be portions of the actual physical disk or memory allocated to that VM. Once an application is installed within the VM, the guest OS retrieves files from the virtual disk just as if the files had been pre-stored as the result of a conventional installation of the application. The guest OS of a VM 200 can also be modified to facilitate the implementation of virtualization, as in so-called "paravirtualization". The design and operation of virtual machines are well known in the field of computer science.

Some interface is generally required between the guest software within a VM and the various hardware components and devices in the underlying hardware platform. This interface—which may be referred to generally as "virtualization software" or "virtualization layer"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, the invention described below may be used in virtualized computer systems having any type or configuration of virtualization software.

The invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

According to the preferred embodiment of the invention, kernel 600 or some other software layer or component or group of components that performs the functions described here, executes on the system hardware 100. The kernel 600 supervises the execution of the VMMs 300, and manages the resources of the system hardware 100. In some implementations, specific software support for VMs may be included in the host kernel itself.

As described herein with reference to FIG. 1, the computer system with hardware virtualization support 101 facilitates the separation of virtual machines into distinct hardware protection domains. A hardware protection domain defines which computer resource privileges code running in that domain can access. (Several examples of computer resource privileges are described herein with reference to FIG. 4.) The computer resource privileges allowed in a particular hardware protection domain are referred to as protection domain privileges.

In the example illustrated, VM 200A executes in hardware protection domain 202A and VM 200B executes in hardware protection domain 202B. Each hardware protection domain defines which of the computer resource privileges the respective VMs have access to. The computer system with hardware virtualization support 101 limits the various VMs to the computer resource privileges defined by their respective hardware protection domains.

The computer system with hardware virtualization support 101 facilitates the efficient execution of a plurality of virtual machines. Each virtual machine may, but need not, be separate in design and configuration from the virtual computer implemented by other virtual machines. The strict separation of virtual machines is a benefit in this particular application of the hardware virtualization support 101, and as they are shown in FIG. 2, the hardware protection domains are configured for minimal or carefully coordinated overlap of computer resources between the various domains.

According to one embodiment of the present invention, a computer system with hardware virtualization support executes kernel code and kernel extension code in separate hardware protection domains. A hardware protection domain defines computer resource privileges which code running in that domain can access. A hardware protection domain can define computer resource privileges which code running in that domain can access directly, as well as computer resource privileges which devices 103 controlled by code in that domain can access. The protection domain privileges of a hardware protection domain are enforced by hardware designed to support virtualization and integrated into the computer system.

Figure 3A:
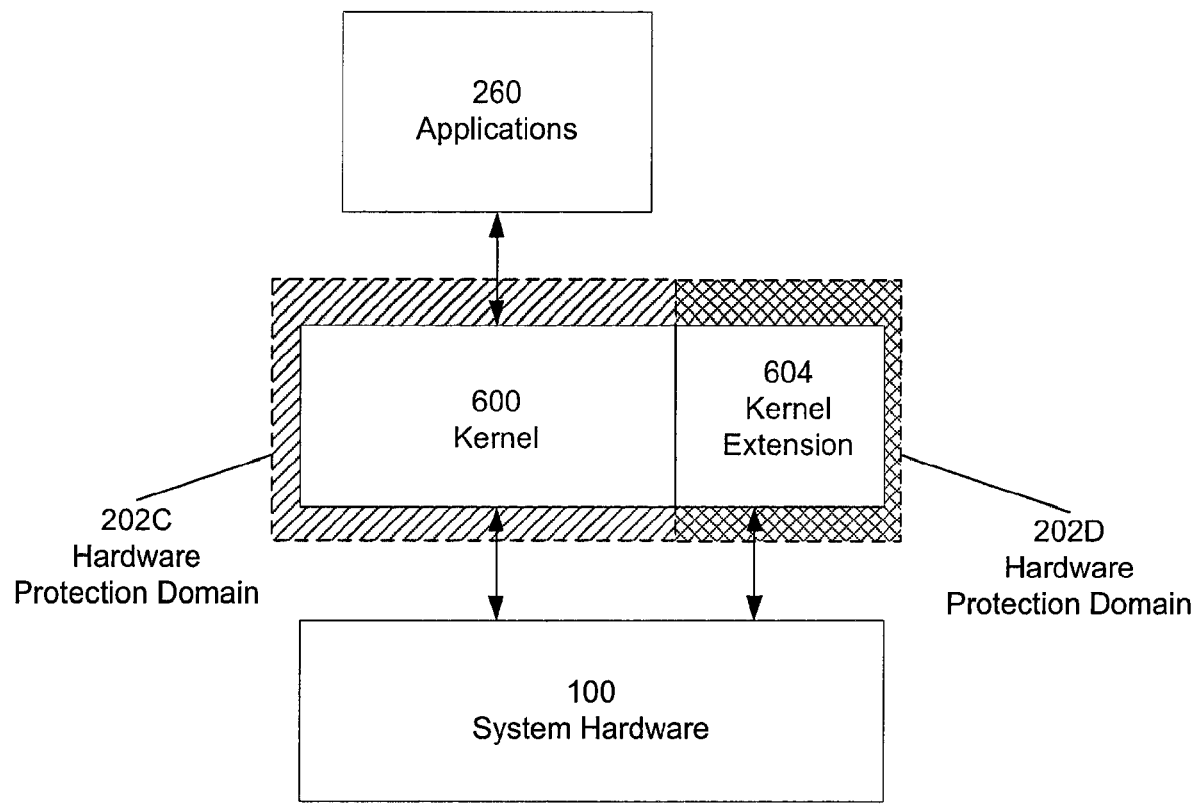
FIG. 3(a) illustrates using a computer system with hardware virtualization support to execute a kernel and a kernel extension in separate hardware protection domains.

FIG. 3(a) illustrates using a computer system with hardware virtualization support to execute a kernel and a kernel extension in separate hardware protection domains. The kernel 600 executes in hardware protection domain 202C and the kernel extension 604 executes in hardware protection domain 202D. The kernel 600 supports the execution of the applications 260, and makes direct calls to the kernel extension 604 for assistance. The kernel 600 and the kernel extension 604 have access, subject to the privileges associated with their respective hardware protection domains, to the system hardware 100.

Because they execute in separate hardware protection domains, the protection domain privileges of the kernel 600 may be different from those of the kernel extension 604. Both the kernel 600 and the kernel extensions 604 may be given the appearance that they are executing with the special execution privilege levels for which they were designed. In one embodiment of the present invention, separate hardware protection domains allow computer resource privileges to be distinguished between modules, even modules that are designed to be executed with special (or "kernel-mode") execution privilege levels Thus, in the computer system with hardware virtualization support 101, protection domain privileges are distinct from execution privilege levels, and the two modes can be manipulated independently.

By executing the kernel extension 604 in a hardware protection domain with more limited protection domain privileges, the kernel extension 604 can be limited to the computer resources privileges that are appropriate for kernel extensions 604's intended purpose. For example, if kernel extension 604 is a device driver associated with a particular device 103, the kernel extension 604 can be limited to the computer resources privileges that are appropriate for controlling the device 103 (such as I/O to the device 103). As another example, if kernel extension 604 is a device driver unrelated to a particular device 103, the kernel extension 604 can be restricted from accessing the device 103. Several examples of how hardware protection domains can be used to limit access to computer resources are described herein with reference to FIG. 4.

Figure 3B:
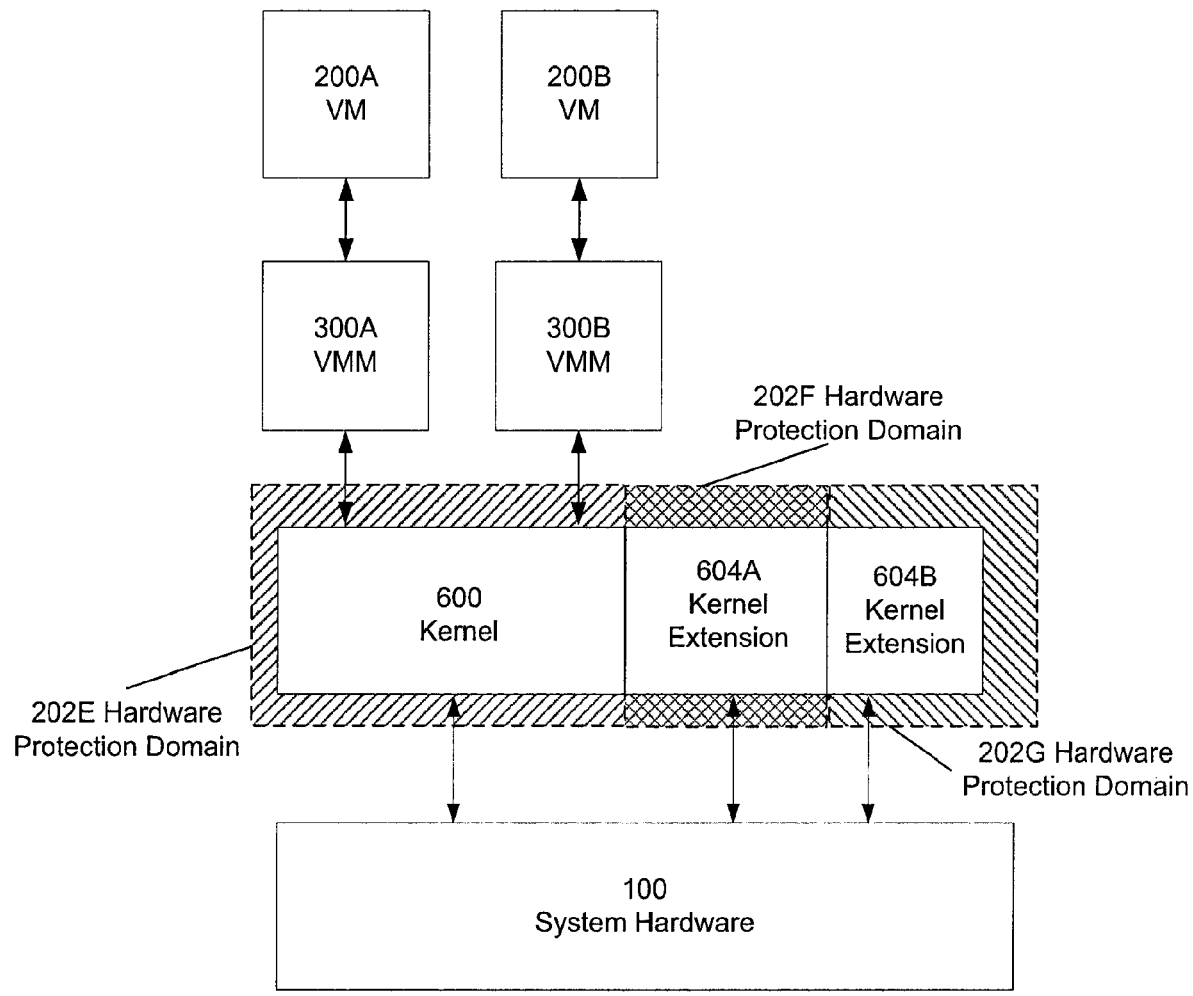
FIG. 3(b) illustrates using a computer system with hardware virtualization support to execute a kernel and various kernel extensions in various hardware protection domains.

FIG. 3(b) illustrates using a computer system with hardware virtualization support to execute a kernel and various kernel extensions in various hardware protection domains. According to one embodiment of the present invention, kernel extensions 604 of a kernel 600 can be isolated using hardware virtualization support. The kernel 600 can oversee the hardware- or software-assisted virtualization of a plurality of virtual machines. One example of software-assisted virtualization is the ESX product of VMware, Inc., of Palo Alto, Calif. The kernel 600 can be implemented as a kernel specially designed to support virtualization, or as an existing, general-purpose kernel (sometimes called a "host kernel"). In some implementations of virtualization, the kernel 600 is referred to as a "hypervisor." According to various embodiments, the invention is applicable to the protection of host kernels, hypervisors, and the like. Discussion herein with regard to the protection of or steps by the kernel 600 should be understood as being applicable to various types of kernels without departing from the scope of the present invention.

As shown in the figure, kernel 600 executes in protection domain 202E, kernel extension 604A executes in hardware protection domain 202F, and kernel extension 604B executes in hardware protection domain 202G. Kernel 600 and kernel extensions 604 are limited to the protection domain privileges of their respective hardware protection domains. In one embodiment of the present invention, one or more of the virtual machines 200 are also restricted to execution in a particular hardware protection domain 202. Executing a virtual machine in a hardware protection domain 202 beneficially allows for more efficient virtualization, and, in some cases, for more robust isolation of the virtual machines 200.

According to various embodiments of the present invention, any number of hardware protection domains can be implemented. Each protection domain can contain any number of kernel extensions 604. Furthermore, according to one embodiment of the present invention, a hardware protection domain can contain both a kernel 600 and a kernel extension 604.

FIG. 4 illustrates several examples of hardware protection domains associated with different computer resource privileges. As described herein with reference to FIG. 1, the hardware virtualization support can be used to establish a plurality of hardware protection domains. Each hardware protection domain defines computer resource privileges that code running in that domain can access. The computer resource privileges allowed in a particular hardware protection domain are referred to as protection domain privileges.

FIG. 4 includes a logical table illustrating hardware protection domains 202 and the computer resource privileges 404 that are allowed under the various hardware protection domains 202. Examples of computer resource privileges, according to various embodiments, include direct memory access (DMA) to particular DMA pages, read/write/execute (alone or in various combinations) to particular virtual pages, input/output instructions for particular ports, and read/write to particular model-specific registers (MSRs). However, other examples of computer resource privileges will be apparent to one of skill in the art without departing from the scope of the current invention. In particular, different computer architectures will provide various forms of computer resource privileges 404, and the hardware protection domains 202 may define subsets of any such computer resource privileges.

In the example illustrated, hardware protection domain 202H has blanket protection domain privileges 406. Code executing in hardware protection domain 202H have access to all of the computer resource privileges 404. A hardware protection domain 202 with expansive or exhaustive protection domain privileges 406 may be beneficial, for example, for executing trusted code with a supervisory role, such as the kernel 600.

Also in the example illustrated, hardware protection domain 202F has protection domain privileges that are a strict subset of the available computer resource privileges 404. Code executing in hardware protection domain 202F are allowed to perform DMA to page 17, and to read/write/execute pages 17 and 18. Hardware protection domain 202F may be beneficial, for example, for executing a kernel extension 604, such as a device driver, which should be able to DMA and access certain pages of memory.

Further in the example illustrated, hardware protection domain 202G has protection domain privileges that are a strict subset of the available computer resource privileges 404, but that are different from those of hardware protection domain 202F. Code executing in hardware protection domain 202G are allowed to read/write/execute page 18 and perform input/output instructions directed to port 2. Hardware protection domain 202G may be beneficial, for example, for executing a kernel extension 604, such as a file system, which should be able to access certain pages of memory and perform input/output instructions directed to certain ports.

The table illustrated in FIG. 4 represents the logical status of various hardware protection domains 202 with regard to available computer resource privileges 404 at a particular moment in time. The hardware protection domain 202 policies may or may not be organized in a centralized manner. According to one embodiment of the present invention, the policies for some computer resource privileges 404 are maintained by a hardware component (such as the CPU 104) that is distinct from the hardware component (such as the I/O MMU 118) maintaining the policies for other computer resource privileges 404.

Furthermore, the protection domain privileges 406 can change over time. According to one embodiment of the present invention, the protection domain privileges 406 are modified in the course of code execution. Also in the course of code execution, hardware protection domains can also be instantiated or terminated.

Figure 5A:
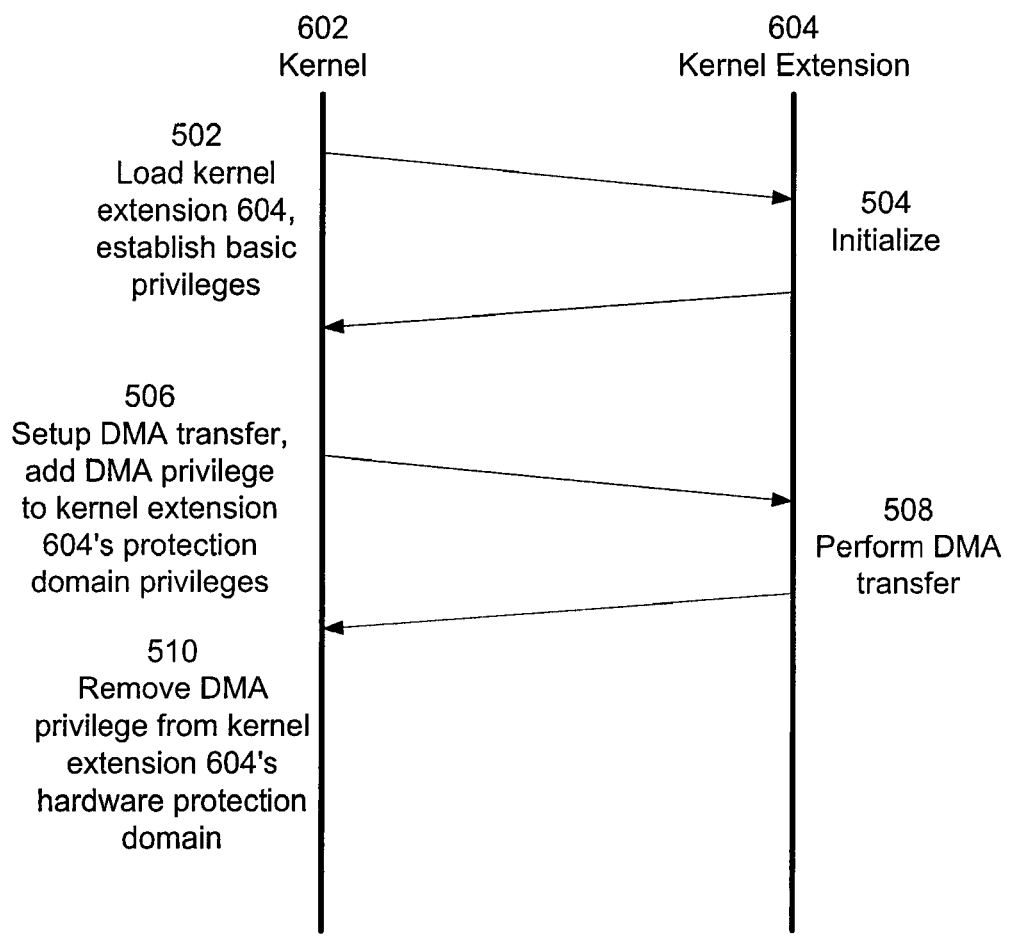
FIGS. 5(a) and 5(b) illustrate several examples of calls and returns between a kernel and a kernel extension executing in different hardware protection domains.
Figure 5B:
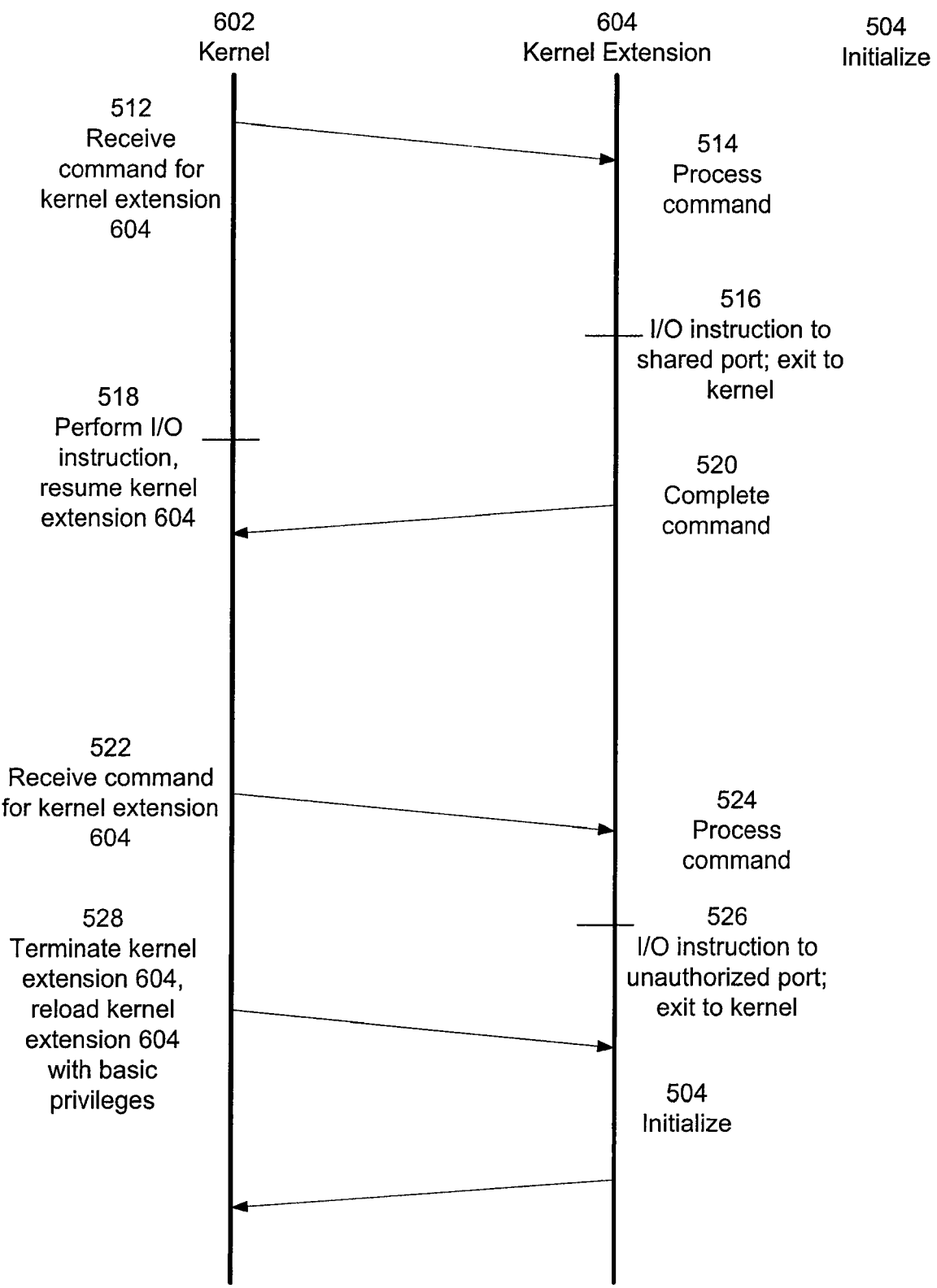

FIGS. 5(a) and 5(b) illustrate several examples of calls and returns between a kernel and a kernel extension executing in different hardware protection domains. In the examples illustrated in FIGS. 5(a) and 5(b), the kernel extension 604 is a device driver. Referring now to FIG. 5(a), the kernel 600 loads 502 the kernel extension 604 and establishes a hardware protection domain in which the kernel extension 604 will execute. The hardware protection domain is established with basic protection domain privileges, such as standard read/write/execute privileges for virtual memory pages in the kernel extension 604's virtual memory address space. Limiting the hardware protection domain to basic protection domain privileges prevents the kernel extension 604 from corrupting computer system resources. The kernel 600 calls the kernel extension 604's initialization function.

The kernel extension 604 initializes 504. The kernel extension 604 returns to the kernel 600.

After some time has elapsed, the kernel 600 sets up 506 a Direct Memory Access (DMA) transfer. As part of the DMA setup, the kernel 600 modifies the protection domain privileges of the hardware protection domain in which kernel extension 604 will execute. The kernel 600 adds computer resource privileges to the hardware protection domain to support the DMA transfer. For example, after the modification, the protection domain privileges may include the ability to access specific DMA pages and to perform input/output instructions on specific ports. Adding protection domain privileges relevant to the expected activities of the kernel extension 604 allows the kernel extension 604 to carry out its tasks. The kernel 600 calls to the kernel extension 604 to perform the DMA transfer.

The kernel extension 604 performs 508 the DMA transfer. Because the hardware protection domain has been configured for the privileges involved in a DMA transfer, the DMA transfer is successful.

The kernel 600 removes 510 computer resource privileges from the hardware protection domain after the completion of the DMA transfer. As part of the DMA clean-up, the kernel 600 modifies the protection domain privileges of the hardware protection domain in which kernel extension 604 is executing. The kernel 600 removes computer resource privileges that are no longer appropriate for the tasks of the kernel extension 604. For example, after the modification, the protection domain privileges may no longer include the ability to access specific DMA pages and to perform input/output instructions on specific ports. Removing protection domain privileges no longer appropriate to the tasks of the kernel extension 604 prevents the kernel extension 604 from corrupting computer system resources.

The example of a DMA transfer has been shown as one example of a task involving setup, addition of protection domain privileges, execution, clean-up, and removal of protection domain privileges. According to one embodiment of the present invention, the kernel 600 adds and removes protection domain privileges as tasks are assigned and performed by the kernel extension 604. Other examples of tasks involving the addition or removal of protection domain privileges will be apparent to one of skill in the art without departing from the scope of the present invention.

Referring now to FIG. 5(b), the kernel 600 receives 512 a command for the kernel extension 604. According to one embodiment of the present invention, the kernel 600 acts as an intermediary between applications and the kernel extension 604. For example, an application running on the computer system with virtualization support 101 can access a device 103 by calling to the kernel 600, which in turn calls to the kernel extension 604, which in turn handles access to the device 103.

The kernel 600 calls to the kernel extension 604, and kernel extension 604 processes 514 the command from the application. In the example illustrated, in responding to the request by the kernel 600, the kernel extension 604 attempts 516 to execute an input/output instruction to a shared port. The hardware protection domain in which the kernel extension 604 is executing does not include a protection domain privilege for executing an input/output instruction to the shared port, and the instruction is caught by the privilege monitor 106 and exits back to kernel 600.

The kernel 600 performs 518 the input/output instruction. In the example illustrated, the hardware protection domain in which the kernel 600 is executing includes a protection domain privilege for executing an input/output instruction to the shared port. The instruction executes successfully, and the kernel 600 calls back to the kernel extension 604 to resume.

The kernel extension 604 resumes and completes 520 the command. According to one embodiment of the present invention, the fact that the attempt to execute the input/output instruction exited to the kernel 600 is transparent to the kernel extension 604, and, because the kernel 600 completed the instruction, the kernel extension 604 continues operation as if the input/output instruction executed normally. When the command is complete, the kernel extension 604 returns to the kernel 600.

The example of an input/output instruction to a shared port has been given as an example of an instruction which it may be risky to authorize the kernel extension 604 to execute, but which the kernel 600 can safely execute on behalf of the kernel extension 604. Certain computer resource privileges pose a risk to system stability if used improperly, and can be withheld from the kernel extension 604. Exiting to the kernel 600 when the kernel extension 604 attempts to perform an action using this type of computer resource privilege allows the kernel 600 to intervene and perform the action safely, and without compromising the isolation of the kernel extension 604.

In another example, the kernel 600 receives 522 a command for the kernel extension 604. As before, the kernel 600 acts as an intermediary between applications and the kernel extension 604. The kernel 600 calls to the kernel extension 604, and kernel extension 604 processes 524 the command from the application. In the example illustrated, in the process of responding to the request, the kernel extension 604 attempts 526 to execute an input/output instruction to an unauthorized port, such as a port associated with a different kernel extension. The hardware protection domain in which the kernel extension 604 is executing does not include a protection domain privilege for executing an input/output instruction to the unauthorized port, and the instruction is caught by the privilege monitor 106 and exits back to kernel 600.

The kernel 600 terminates 528 the kernel extension 604. In some cases, for example if the attempted action cannot be safely performed by the kernel 600, terminating the kernel extension 604 may be the best option for the stability of the kernel extension 604 and the computer system.

According to one embodiment of the present invention, the kernel 600 determines whether the kernel extension 604 should be reloaded. The determination can depend, for example, on the nature of the attempted protection domain privilege violation, or on the number of violations attempted by the kernel extension 604. According to one embodiment of the present invention, the determination 600 can depend on kernel extension management policies configurable by a user or administrator. If the kernel 600 determines that the kernel extension 604 should be reloaded, the kernel 600 reloads the kernel extension 604. The kernel extension 604 initializes 504, and is ready to receive future calls by the kernel 600. The kernel extension 604 returns to the kernel 600.

As shown in FIG. 5(*b*), the kernel 600 can respond to attempted violations of protection domain privileges in a variety of ways. Some attempted violations may be resolvable by the kernel 600. For example, the kernel 600 can perform the action on behalf of the kernel extension 604, or increase the protection domain privileges of the hardware protection domain in which the kernel extension 604 is executing. Other attempted violations may not be resolvable by the kernel 600 without compromising the stability or security of the computer system. The kernel 600 can respond, for example, by terminating the kernel extension 604, or if the attempted actions of the kernel extension 604 appear particularly malicious, by preventing the kernel extension 604 from loading in the future.

Figure 6:
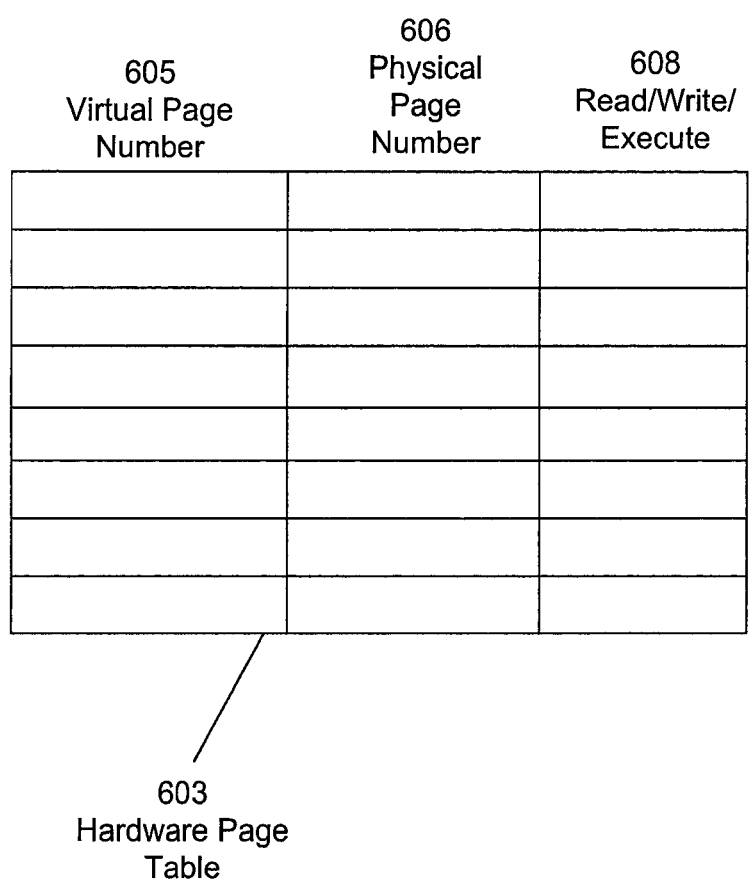
FIG. 6 illustrates one example of a hardware page table useful for implementing hardware protection domains.
Figure 7:
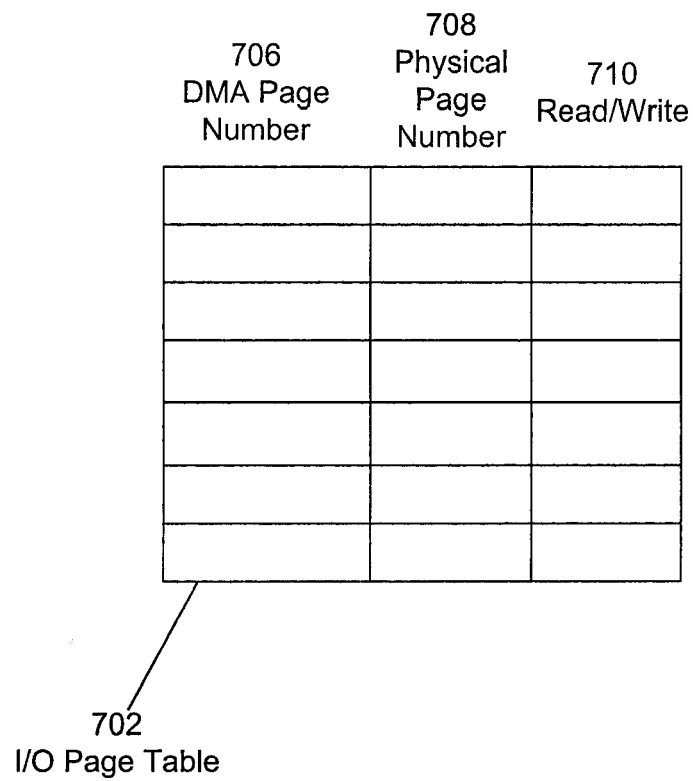
FIG. 7 illustrates one example of an input/output page table useful for implementing hardware protection domains.
Figure 8:
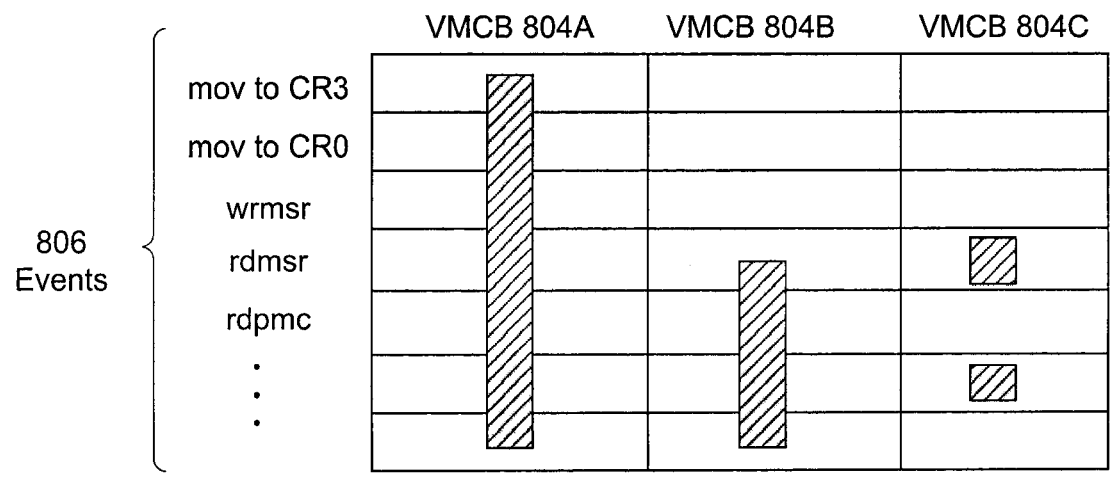
FIG. 8 illustrates one example of an event policy useful for implementing hardware protection domains.

FIGS. 6-8 illustrate various systems and methods for organizing and enforcing protection domain privileges according to various embodiments of the present invention. These examples are given for the purpose of illustration and are not limiting. In different system architectures protection domain privileges can be organized and enforced in differing ways. One of skill in the art will recognize other systems and methods for implementing hardware protection domains and their associated protection domain privileges without departing from the scope of the present invention.

FIG. 6 illustrates one example of a hardware page table useful for implementing hardware protection domains. As described herein with reference to FIG. 4, the protection domain privileges defined by a hardware protection domain can include the privilege of reading, writing, and/or executing memory locations in specific pages of memory. According to one embodiment of the present invention, a hardware page table 603 is used to organize and enforce computer resource privileges related to memory access by the CPU 104. The hardware page table 603 is organized and enforced by the MMU 108. The hardware page table 603 is typically updated, by the kernel 600.

The hardware page table 603 maps virtual page numbers of a virtual memory address space to physical page numbers of a physical address space. According to one embodiment of the present invention, each kernel extension 604 executes in its own virtual memory address space. The kernel extension code 604 accesses memory using virtual memory addresses, which are translated using the hardware page table 603 to corresponding physical memory addresses.

The hardware page table 603 is indexed by virtual page numbers 605. The virtual page numbers 605 can be explicitly stored in the hardware page table 603, or they can be implicitly stored by the organization of the hardware page table 603. Entries in the hardware page table 603 map to corresponding physical page numbers 606. Entries in the hardware page table 603 also include permission bits 608 indicating whether the virtual page is available for reading, writing, and/or execution.

The hardware page table 603 can be used to enforce the protection domain privileges of a hardware protection domain as follows. Each hardware protection domain is associated with a virtual memory address space. In response to memory requests, the kernel 600 allocates the virtual pages of a hardware protection domain to code executing in that hardware protection domain. The virtual pages of a first virtual memory address space can map to different physical pages than those mapped by the virtual pages of a second virtual memory address space. In this way, code (such as the kernel 600) executing in a first hardware protection domain will be isolated from the effects on memory caused by code executing in a second hardware protection domain.

In some cases, it may be appropriate for code executing in different hardware protection domains to interact through shared memory. The permission bits 608 can be used to control access to virtual pages. For example, the kernel 600 can write to a first virtual page that is mapped to some shared physical page to which a second virtual page (assigned to a kernel extension 604) is also mapped. It may be appropriate for the kernel extension 604, executing in a different hardware protection domain, to read from the second virtual page. In this case, the kernel extension 604 can be isolated from the kernel 600 by marking the second virtual page as read-only in the hardware page table 603. The kernel 600 can write to the shared physical page, which the kernel extension 604 can read, but the kernel extension 604 is prohibited from writing (and presumably corrupting) the shared physical page. According to one embodiment of the present invention, virtual pages can also be marked as write-only.

If the kernel extension 604 attempts to access a virtual page that is not mapped to a physical page, or attempts to perform an action on a virtual page that would be in violation of the permission bits 608, the MMU 108 traps the attempted action and calls to the kernel 600, which responds appropriately. For example, the kernel 600 can terminate the kernel extension 604, or the kernel 600 can expand the protection domain privileges of the kernel extension 604's hardware protection domain appropriately.

FIG. 7 illustrates one example of an input/output page table useful for implementing hardware protection domains. As described herein with reference to FIG. 4, the protection domain privileges defined by a hardware protection domain can include the privilege of Direct Memory Access (DMA) reads, and/or writes to memory locations in specific pages of memory. According to one embodiment of the present invention, an I/O page table 702 is used to organize and enforce computer resource privileges related to memory access by the devices 103. The I/O page table 702 is organized and enforced by the I/O MMU 118. The I/O page table 702 is typically updated by the kernel 600.

The I/O page table 702 maps DMA page numbers of a DMA memory address space to physical page numbers of a physical address space. According to one embodiment of the present invention, a device 103 can access memory for DMA transfers by using its DMA memory address space. A device 103 is associated with a protection ID, and the protection ID can be used to identify the DMA memory address space of the device 103. The protection ID identifies a particular I/O page table 702, and the I/O page table 702 maps the DMA page number to a corresponding physical page number.

The I/O page table 702 is indexed by DMA page numbers 706. The DMA page numbers 706 can be explicitly stored in the I/O page table 702, or they can be implicitly stored by the organization of the I/O page table 702. Entries in the I/O page table 702 map to corresponding physical page numbers 708. Entries in the I/O page table 702 also include permission bits 710 indicating whether the virtual page is available for DMA reading and/or writing.

The I/O page table 702 can be used to enforce the protection domain privileges of a hardware protection domain as follows. A kernel extension 604 executing in the hardware protection domain controls a device 103. The device 103 is associated with a first DMA memory address space. In the process of setting up DMA transfers for the device 103, the kernel 600 allocates DMA pages of the first DMA memory address space to the device 103. The kernel 600 writes to the I/O page table 702, mapping the DMA pages to available physical pages and setting the permission bits 710 appropriately for the DMA transfer. Other code using physical pages will be protected from the actions of a device 103 controlled by a kernel extension 604 executing in a first hardware protection domain.

In many cases, it will be appropriate for a device controlled by code executing in a first hardware protection domain and code executing in different hardware protection domains to interact through shared memory. The permission bits 710 can be used to control access by a device 103 to DMA pages. For example, kernel extension 604A can write to a virtual page that is mapped to some shared physical page to which a DMA page (associated with a device 103 controlled by kernel extension 604B) is also mapped. It may be appropriate for the device controlled by kernel extension 604B (which is executing in a different hardware protection domain) to read from the second virtual page. In this case, the kernel extension 604A can be isolated from the device 103 by marking the DMA page as read-only in the I/O page table 702. The kernel extension 604A can write to the shared physical page, which the device 103 can read, but device 103 is prohibited from writing (and presumably corrupting) the shared physical page. According to one embodiment of the present invention, DMA pages can also be marked as write-only.

If a device 103 attempts to access a DMA page that is not mapped to a physical page, or attempts to perform an action on a DMA page that would be in violation of the permission bits 710, the I/O MMU 118 traps the attempted action and exits to the kernel 600, which can respond appropriately. For example, the kernel 600 can terminate the kernel extension 604 and reset the device 103, or the kernel 600 can expand the protection domain privileges of the kernel extension 604's hardware protection domain appropriately.

FIG. 8 illustrates one example of an event policy useful for implementing hardware protection domains. As described herein with reference to FIG. 4, a hardware protection domain can be used to force a change in hardware protection domain in response to certain events.

According to one embodiment of the present invention, protection domain privileges for various events are organized and enforced by the permission monitor 106. Each hardware protection domain is associated with a corresponding virtual machine control block (VMCB) 804. ("Virtual machine control block" is a term of art used in various hardware architectures. As discussed herein with reference to FIG. 3(a), the present invention is not limited to cases of virtualization, and in the context of this disclosure, a hardware protection domain need not be, and many cases is not, associated with virtualization in any way.)

A VMCB 804 identifies which of the events 806 can be handled when CPU 104 is executing with that VMCB 804 active. An event can be, for example, the execution of a specific instruction, a fault, an external interrupt (IRQ), an interprocessor interrupt (IPI), and so on. The events possible on a CPU 104 can vary from architecture to architecture.

As shown in FIG. 8, the kernel 600 executes in a first hardware protection domain that is associated with VMCB 804A. All of the events 806 are allowed under VMCB 804A. The kernel 600 can execute any instruction available on the CPU 104, and can handle any interrupts that might be received by the CPU 104.

Kernel extension 604A is executing in a second hardware protection domain that is associated with VMCB 804B. A strict subset of the events 806 are allowed under VMCB 804B. For example, if the kernel extension 604A attempts to execute an instruction modifying an MSR, this instruction will be permitted. As another example, if the kernel extension 604B attempts to execute an instruction modifying the hardware page table 603, this instruction will not be permitted, and the CPU 104 will exit to code executing with more expansive protection domain privileges, such as the kernel 600. By exiting to the kernel 600 when the kernel extension 604A attempts to execute certain instructions, the appropriateness of the instruction can be evaluated and the execution of the instruction coordinated with other code to ensure the isolation of the kernel extension 604A.

Events 806 can also include external events such as interrupts. As shown in FIG. 8, kernel extension 604B is executing in a third hardware protection domain that is associated with VMCB 804C. Only a subset of the events 806 are allowed under VMCB 804C. For example, if an external interrupt is received while the kernel extension 604B is executing, the CPU 104 will exit to code executing with more expansive protection domain privileges, such as the kernel 600. The kernel 600 can handle the external interrupt while ensuring the isolation of the kernel extension 604B.

By controlling the events 806 that can be executed and/or handled under the various hardware protection domains, kernel extensions can be given the impression that they are executing with special instruction privilege levels without compromising the isolation of the kernel extension. A kernel extension can seemingly execute an instruction which has the potential to compromise the stability of the computer system, while in fact the instruction (or some substitute) is executed by the kernel 600 on behalf of the kernel extension 604. Kernel extensions are efficiently and effectively isolated while executing with their native instruction privilege level.

While protecting a kernel from the actions of kernel extension has been prominently discussed as an example of isolation, other examples of isolation are also within the scope of the present invention. For example, the systems and methods described herein can be used to protect a kernel extension from the actions of a kernel, one kernel extension from the actions of another, and so on. Various segments of kernel-mode code can be isolated from other segments of kernel-mode code executing in the same instruction address space, and the degree of isolation can be adjusted to a level that is appropriate for the amount and type of interaction that occurs between the various segments of code. Hardware virtualization support, when used in the context of the present invention, can protect the computer system from privileged code without compromising the effectiveness of that code.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for isolating a kernel extension in a computer system with hardware virtualization support, the method comprising:
   executing a kernel in a first hardware protection domain, including calling to a first kernel extension, a first set of computer resource privileges being allowed for code executing in the first hardware protection domain;
   executing the first kernel extension in a second hardware protection domain, a second set of computer resource privileges being allowed for code executing in the second hardware protection domain, the first set of computer resource privileges being different from the second set of computer resource privileges, wherein each hardware protection domain is determined at least in part by events described in a virtual machine control data structure provided by the hardware virtualization support;
   wherein the kernel and the first kernel extension execute in a common execution privilege level, the common execution privilege level being a special execution privilege level allowing execution of instructions that are not allowed in other execution privilege levels; and
wherein no virtualization hypervisor or emulation layer is interposed between hardware of the computer system and either the kernel or the first kernel extension.

2. The method of claim 1, wherein the first hardware protection domain is associated with a first virtual memory address space, and wherein the second hardware protection domain is associated with a second virtual memory address space.

3. The method of claim 2, wherein the first virtual memory address space is different from the second virtual memory address space.

4. The method of claim 2, wherein the first virtual memory address space comprises a first virtual page mapped to a first physical page, and wherein the second virtual memory address space comprises a second virtual page mapped to a second physical page.

5. The method of claim 4, wherein the first physical page is the same as the second physical page.

6. The method of claim 4, wherein the second set of computer resource privileges comprises a read-only permission for the second virtual page.

7. The method of claim 4, wherein the second set of computer resource privileges comprises a write-only permission for the second virtual page.

8. The method of claim 1, wherein the first hardware protection domain is associated with a first virtual memory address space, and wherein the second hardware protection domain is associated with a DMA memory address space.

9. The method of claim 8, wherein the first virtual memory address space comprises a first virtual page mapped to a first physical page, and wherein the DMA memory address space comprises a DMA page mapped to a second physical page.

10. The method of claim 9, wherein the first physical page is the same as the second physical page.

11. The method of claim 9, wherein the second set of computer resource privileges comprises a read-only permission for the DMA page.

12. The method of claim 9, wherein the second set of computer resource privileges comprises a write-only permission for the DMA page.

13. The method of claim 1, further comprising:
responsive to the execution of the first kernel extension, adding a computer resource privilege to the second set of computer resource privileges.

14. The method of claim 1, further comprising:
responsive to the execution of the first kernel extension, removing a computer resource privilege from the second set of computer resource privileges.

15. The method of claim 1, further comprising:
responsive to an attempted violation of the second set of computer resource privileges, terminating the first kernel extension.

16. The method of claim 1, wherein the first set of computer resource privileges contains at least one computer resource privilege not contained in the second set of computer resource privileges.

17. The method of claim 1, wherein the second set of computer resource privileges contains at least one computer resource privilege not contained in the first set of computer resource privileges.

18. The method of claim 1, further comprising executing a second kernel extension in a third hardware protection domain, a third set of computer resource privileges being allowed for code executing in the third hardware protection domain, wherein the third set of computer resource privileges is different from the first and second set of computer resource privileges.

19. The method of claim 1, wherein the first kernel extension comprises a device driver.

20. The method of claim 1, wherein the first kernel extension comprises a file system.

21. The method of claim 1, wherein the first kernel extension comprises a stream module.

22. The method of claim 1, wherein the first kernel extension comprises a network protocol module.

23. The method of claim 1, wherein the hardware virtualization support is selected from the group consisting of Intel Virtualization Technology and AMD Secure Virtual Machine.

24. The method of claim 1, wherein the second set of computer resource privileges comprises a set of events that are authorized in the second hardware protection domain.

25. The method of claim 24, further comprising:
responsive to an event not included in the set of events that are authorized in the second hardware protection domain, said event occurring during the execution of the kernel extension, exiting to the kernel.

26. The method of claim 1, wherein the first kernel extension executes with a special permission level.

27. A non-transitory computer-readable medium containing computer program code for configuring a computer system to perform a method for isolating a kernel extension in a computer system with hardware virtualization support, the method comprising:
executing a kernel in a first hardware protection domain, the kernel comprising executable code for calling to a first kernel extension, a first set of computer resource privileges being allowed for code executing in the first hardware protection domain;
executing the first kernel extension in a second hardware protection domain, a second set of computer resource privileges being allowed for code executing in the second hardware protection domain, the first set of computer resource privileges being different from the second set of computer resource privileges, wherein each hardware protection domain is determined at least in part by events described in a virtual machine control data structure provided by the hardware virtualization support;
wherein the kernel and the first kernel extension execute in a common execution privilege level, the common execution privilege level being a special execution privilege level allowing execution of instructions that are not allowed in other execution privilege levels; and
wherein no virtualization hypervisor or emulation layer is interposed between hardware of the computer system and either the kernel or the first kernel extension.

28. The machine readable medium of claim 27, wherein the first hardware protection domain is associated with a first virtual memory address space, and wherein the second hardware protection domain is associated with a second virtual memory address space.

29. The machine readable medium of claim 28, wherein the first virtual memory address space is different from the second virtual memory address space.

30. The machine readable medium of claim 28, wherein the first virtual memory address space comprises a first virtual page mapped to a first physical page, and wherein the second virtual memory address space comprises a second virtual page mapped to a second physical page.

31. The machine readable medium of claim 30, wherein the first physical page is the same as the second physical page.

32. The machine readable medium of claim 30, wherein the second set of computer resource privileges comprises a read-only permission for the second virtual page.

33. The machine readable medium of claim 30, wherein the second set of computer resource privileges comprises a write-only permission for the second virtual page.

34. The machine readable medium of claim 27, wherein the first hardware protection domain is associated with a first virtual memory address space, and wherein the second hardware protection domain is associated with a DMA memory address space.

35. The machine readable medium of claim 34, wherein the first virtual memory address space comprises a first virtual page mapped to a first physical page, and wherein the DMA memory address space comprises a DMA page mapped to a second physical page.

36. The machine readable medium of claim 35, wherein the first physical page is the same as the second physical page.

37. The machine readable medium of claim 35, wherein the second set of computer resource privileges comprises a read-only permission for the DMA page.

38. The machine readable medium of claim 35, wherein the second set of computer resource privileges comprises a write-only permission for the DMA page.

39. The machine readable medium of claim 27, wherein the method further comprises:
responsive to the execution of the first kernel extension, adding a computer resource privilege to the second set of computer resource privileges.

40. The machine readable medium of claim 27, wherein the method further comprises:
responsive to the execution of the first kernel extension, removing a computer resource privilege from the second set of computer resource privileges.

41. The machine readable medium of claim 27, wherein the method further comprises:
responsive to an attempted violation of the second set of computer resource privileges, terminating the first kernel extension.

42. The machine readable medium of claim 27, wherein the first set of computer resource privileges contains at least one computer resource privilege not contained in the second set of computer resource privileges.

43. The machine readable medium of claim 27, wherein the second set of computer resource privileges contains at least one computer resource privilege not contained in the first set of computer resource privileges.

44. The machine readable medium of claim 27, wherein the method further comprises:

executing a second kernel extension at the common execution privilege level in a third hardware protection domain, a third set of computer resource privileges are allowed for code executing in the third hardware protection domain, the third set of computer resource privileges is different from the first and second set of computer resource privileges, and no virtualization hypervisor or emulation layer is interposed between hardware of the computer system and either the kernel or the first kernel extension.

45. The machine readable medium of claim 27, wherein the first kernel extension comprises a device driver.

46. The machine readable medium of claim 27, wherein the first kernel extension comprises a file system.

47. The machine readable medium of claim 27, wherein the first kernel extension comprises a stream module.

48. The machine readable medium of claim 27, wherein the first kernel extension comprises a network protocol module.

49. The machine readable medium of claim 27, wherein the hardware virtualization support is selected from the group consisting of Intel Virtualization Technology and AMD Secure Virtual Machine.

50. The machine readable medium of claim 27, wherein the second set of computer resource privileges comprises a set of events that are authorized in the second hardware protection domain.

51. The machine readable medium of claim 50, wherein the method further comprises:

responsive to an event not included in the set of events that are authorized in the second hardware protection domain, said event occurring during the execution of the kernel extension, exiting to the kernel.

52. The machine readable medium of claim 27, wherein the first kernel extension executes with a special permission level.

* * * * *